(12) United States Patent
Ploplys et al.

(10) Patent No.: US 8,437,972 B2
(45) Date of Patent: May 7, 2013

(54) SENSOR BIAS ESTIMATION FOR MULTIPLE HYPOTHESIS TRACKER

(75) Inventors: Nicholas J. Ploplys, Redondo Beach, CA (US); Brian A. Cronin, Hermosa Beach, CA (US); Samuel S. Blackman, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 267 days.

(21) Appl. No.: 12/831,978

(22) Filed: Jul. 7, 2010

(65) Prior Publication Data

US 2012/0010853 A1 Jan. 12, 2012

(51) Int. Cl.
 *G06F 17/18* (2006.01)
 *G06N 5/02* (2006.01)
(52) U.S. Cl.
 USPC .......................................... 702/104; 702/150
(58) Field of Classification Search ................. 702/104, 702/150, 158, 196
See application file for complete search history.

(56) References Cited

U.S. PATENT DOCUMENTS

2009/0271108 A1* 10/2009 Kobori et al. ................. 701/208

OTHER PUBLICATIONS

Kastella, K., et al., "Bias Modeling and Estimation for GMTI Applications," ISIF, Proceedings of the Third International Conference on Information Fusion, vol. 1, 2000 (pp. TuC1-7-TuCi-12).

* cited by examiner

*Primary Examiner* — Michael Nghiem
*Assistant Examiner* — Manuel Rivera Vargas
(74) *Attorney, Agent, or Firm* — Christie, Parker & Hale, LLP

(57) ABSTRACT

A method for measuring sensor bias and a method for estimating sensor bias is provided. Road location data is obtained. Sensor observation data is obtained. A sensor observation is identified that corresponds to an on-road target moving on a known road. A measurement of one-dimensional sensor bias is formed. As one-dimensional sensor bias measurements accumulate, multi-dimensional sensor bias is estimated. Sensor bias estimates may then be incorporated into a multiple hypothesis tracker system.

8 Claims, 9 Drawing Sheets

SENSOR BIAS ESTIMATION FOR MULTIPLE HYPOTHESIS TRACKER

BACKGROUND OF THE INVENTION

1. Field of the Invention

The present invention relates generally to methods and systems for the measurement and estimation of sensor bias in tracking systems.

2. Description of Related Art

Sensor bias in tracking systems can result in significant target tracking difficulties. Existing single-sensor and multi-sensor bias estimation techniques are unable to provide absolute sensor bias estimates in many real tracking situations.

Most single-sensor bias estimation techniques use cooperative or stationary targets. Use of stationary targets in single-sensor bias estimation presents limitations related to the availability of stationary targets and the limitation of using stationary targets in collecting multiple bias estimates when sensors are moving at high speeds. Use of cooperative targets with known trajectories in estimating sensor bias also presents substantial limitations in that cooperative targets are rarely present in real tracking situations.

Most multi-sensor bias estimation techniques rely on comparisons across multiple sensor observations or track trajectories. Multi-sensor estimation techniques are limited because such comparisons require a common coverage region, and because they can only estimate relative biases between the sensors.

Thus, there exists a need for a system and method for sensor bias estimation that eliminates the need for cooperative or stationary targets that produces absolute rather than relative bias estimates.

SUMMARY OF THE INVENTION

The invention relates to a system and method for estimating sensor biases using known road data within a tracking system.

One embodiment of the present invention provides a system for measuring sensor bias wherein the system obtains road location data, obtains sensor observation data, identifies a sensor observation and known road for comparison, and forms a sensor bias measurement. This system may be implemented in a single or multiple sensor system.

The system may identify a sensor observation and known road for comparison by obtaining information from an interacting multiple model system that identifies target observations that correspond to on-road tracks. The interacting multiple model system may be a component of a multiple hypotheses tracking system.

One embodiment of the present invention estimates sensor bias for a particular sensor by aggregating multiple sensor bias measurements for that sensor and using the multiple measurements to estimate a sensor bias. The invention may further employ Kalman filtering to update the sensor bias estimate over time based on new sensor bias measurements. This invention may further employ a time constant associated with bias state decay in estimating sensor bias.

In many embodiments of the present invention, the system stores sensor bias estimates for use in connection with a bias compensation system. For example, the invention may provide initial and updated sensor bias estimates to a covariance inflation bias compensation system. In the alternative the invention may provide initial and updated sensor bias estimates to a Schmidt-Kalman bias compensation system. The reduced impact of sensor bias through sensor bias estimation and compensation processes results in significant improvement to the accuracy of a tracking system.

BRIEF DESCRIPTION OF THE DRAWINGS

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

Figure 1:
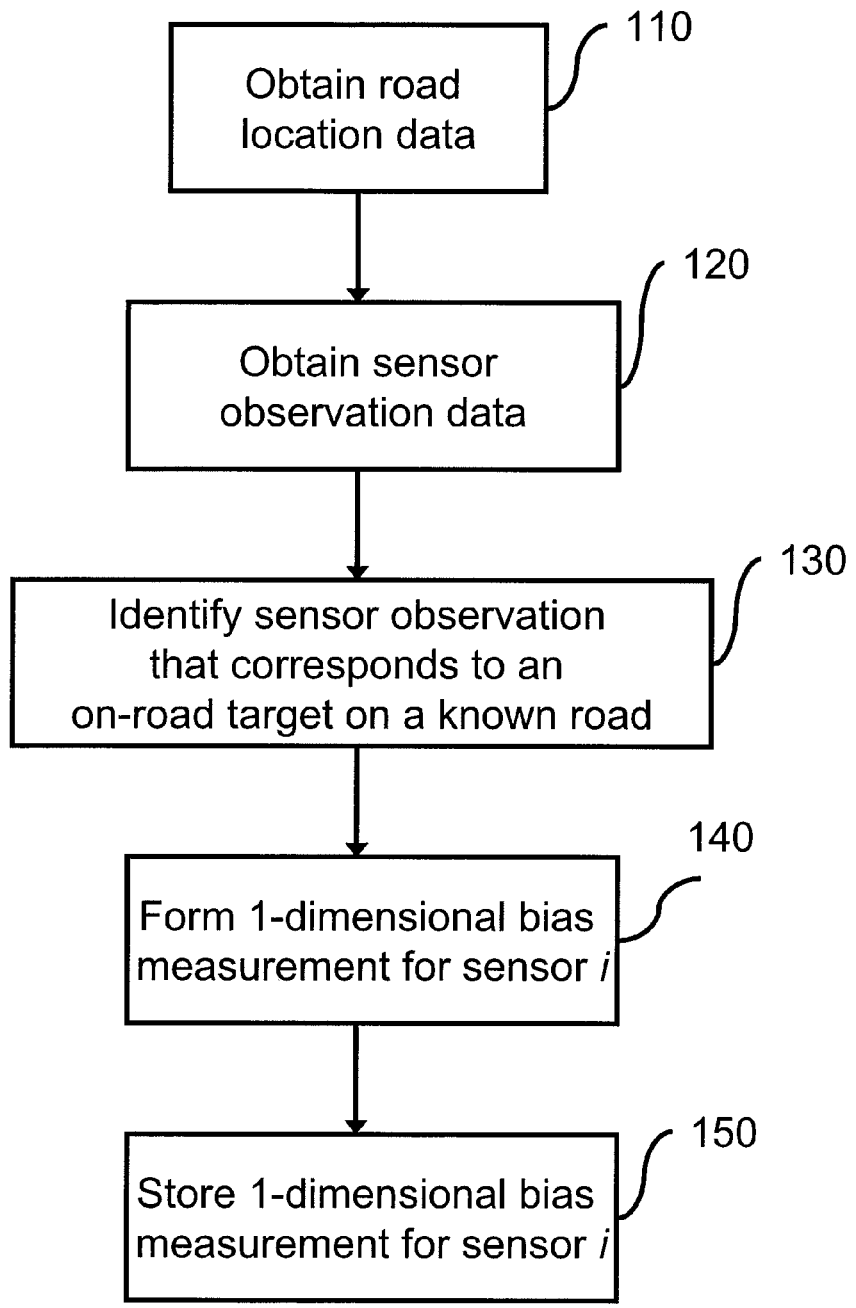
FIG. 1 is a flow diagram illustrating a method for forming and recording a sensor bias measurement according to an embodiment of the present invention.

FIG. 1 is a flow diagram illustrating a method for forming and recording a sensor bias measurement according to an embodiment of the present invention. In this embodiment forming the sensor bias measurement involves pairing observation data with road location data in the case where the observations have been determined to correspond to an on-road target on a known road segment.

As FIG. 1 illustrates, according to this method, the system obtains road location data 110 and sensor observation data 120. The road location data 110 may include information such as longitude, latitude, and altitude information about a series of nodes associated with particular road segments. This information may originate from a local copy of a road location database or may be accessed over a communications network from a remote source. Sensor observation data 120 may include observations, also called measurements, detections, or hits, from a variety of sensors, cameras, electro-optical sensor and infrared sensors. A sensor observation or series of sensor observations is identified that corresponds to an on-road target on a known road 130. In some embodiments the identification of the observation is accomplished through an interactive multiple model ("IMM") system that determines that an observation or series of observations reflects the movement of an on-road target. The IMM may then pass information identifying which observation and which road should be considered in forming bias measurements. The IMM identification is described in greater detail in FIG. 2. An IMM system may exist as a component of a multiple hypothesis tracking system ("MHT"). For a discussion of IMM and MHT systems, see Samuel Blackman, *Design and Analysis of Modern Tracking Systems*, Chapter 16 (Artech House Publishers, 1999), the entire text of which is hereby incorporated by reference for all purposes.

After identifying an observation-to-road pairing, a 1-dimensional sensor bias measurement is formed 140 by calculating the perpendicular distance from an observation to a corresponding road. For each observation that is irrevocable determined by the MHT to have come from an on-road target on a known road (with orientation angle $\theta_j$), a 1-dimensional measurement of the observed off-road distance is formed as: $DR\perp_{ij} = C_{Xpos}^{DR\perp} \Delta X_{pos}$ where $C_{Xpos}^{DR\perp} = [-\sin \theta_j \cos \theta_j \, 0]$ and $\Delta X_{pos} = h_m^{Xpos}(Y) - X_{src\_node}$ where the function $h_m^{Xpos}$ transforms the measurement Y into a position $X_{pos}$. For a linear system, this can be written as $\Delta X_{pos} = H_m^{Xpos} Y - X_{src\_node}$ where $H_m^{Xpos}$ is the Jacobain matrix for the function $h_m^{Xpos}$. This method of forming a bias measurement is illustrated graphically in FIG. 3. The variance associated with an observation from a sensor is computed as: $R_{DR\perp ij} = C_{Xpos}^{DR\perp}(H_m^{Xpos} R_m H_m^{Xpos^T} + R_{src\_node}) C_{Xpos}^{DR\perp^T}$ where $R_{src\_node}$ is the uncertainty in road node positions for the network. Since the observation is believed to have originated from an on-road target, the measured off-road distance may be attributable to sensor bias and random errors in the sensor and roads. The sensitivity of the measured off-road distance to bias error in a sensor is given by $H_{ij}^{DR\perp} = C_{Xpos}^{DR\perp} H_{B_i}^{Xpos}$ where $H_{B_i}^{Xpos}$ is the sensitivity of the measured position $X_{pos}$ to errors in the bias states $B_i$ for sensor 1. In the case where the bias states to be estimated are the same as the measurement states, $H_{B_i}^{Xpos} = H_m^{Xpos}$, though this is not required. The sensor bias measurements are stored 150 as they accumulate over time, and stacked into matrices for use in estimating multi-dimensional sensor bias. The estimation and updating of multi-dimensional sensor bias over time is illustrated greater detail in FIG. 5 through FIG. 7.

Figure 2:
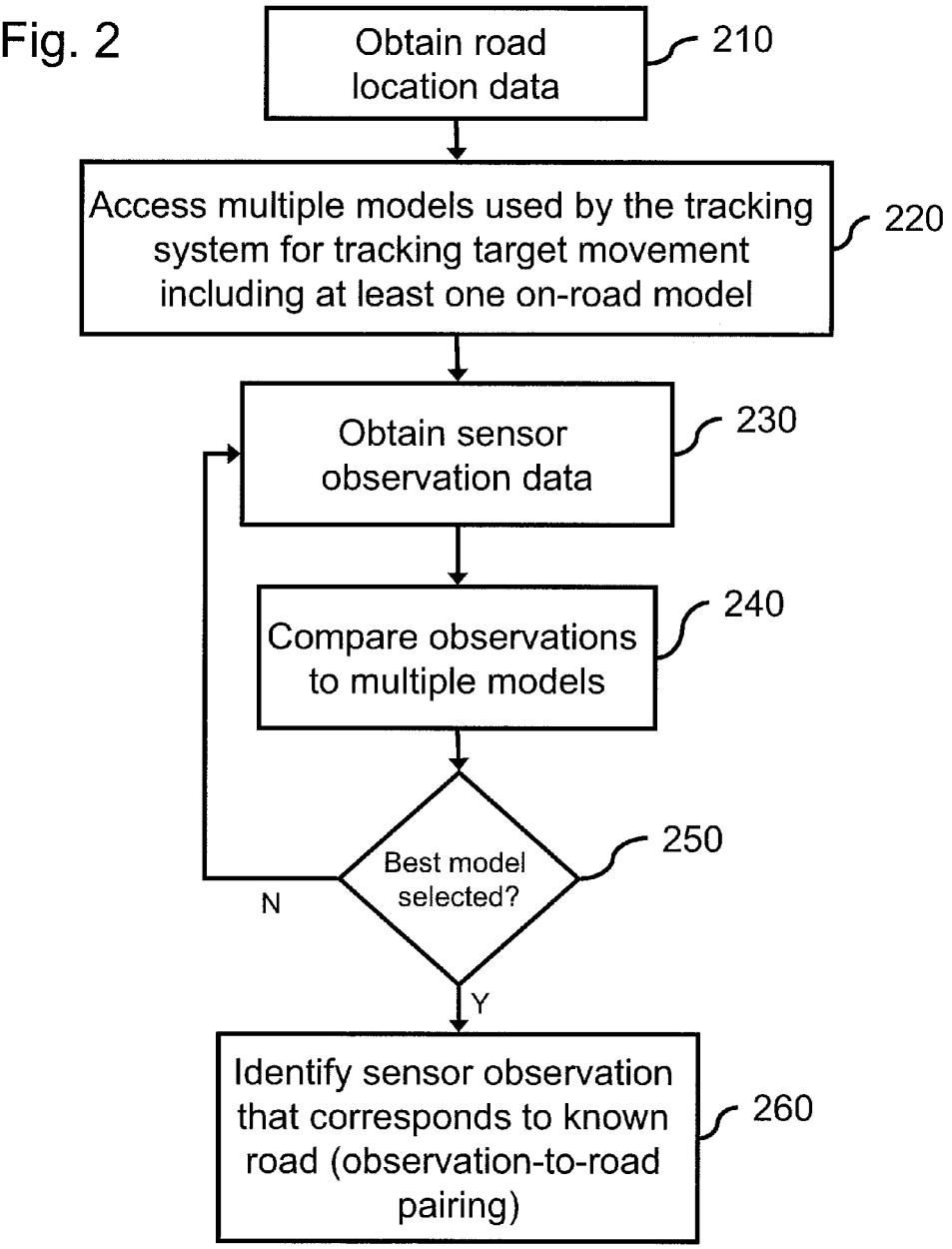
FIG. 2 is a flow diagram illustrating a method for identifying a sensor observation that corresponds to a known road, also known as an observation-to-road pairing, according to an embodiment of the present invention.

FIG. 2 is a flow diagram illustrating a method for identifying a sensor observation that corresponds to a known road, also known as an observation-to-road pairing, according to an embodiment of the present invention.

FIG. 2 illustrates in greater detail, the steps that may allow the identification of a sensor observation that corresponds to a known road location in FIG. 1 130 according to an embodiment of the present invention. As FIG. 2 illustrates, according to this method, the system obtains road location data 210 and accesses the multiple models 220 within the MHT IMM that are constantly updated for tracking target movement. In order to be useful within this method of estimating sensor bias, the multiple models should include at least one on-road model. The on-road model is designed to incorporate the assumption that the target moves on a known road. Other models may incorporate other assumptions, for example an assumption that target moves only in a straight line. According to this method the system obtains sensor observation data 230 and compares sensor observations pertaining to a tracked target to the multiple models 240. Where the on-road model is determined to have a greater than a certain minimum probability of accurately describing target movement at the time that the track is selected as the root node during a track pruning process in the MHT, then the on-road model meets the criteria for use in bias estimation and is selected 250. The associated observation and road are then identified as an observation-to-road pairing 260.

Figure 3:
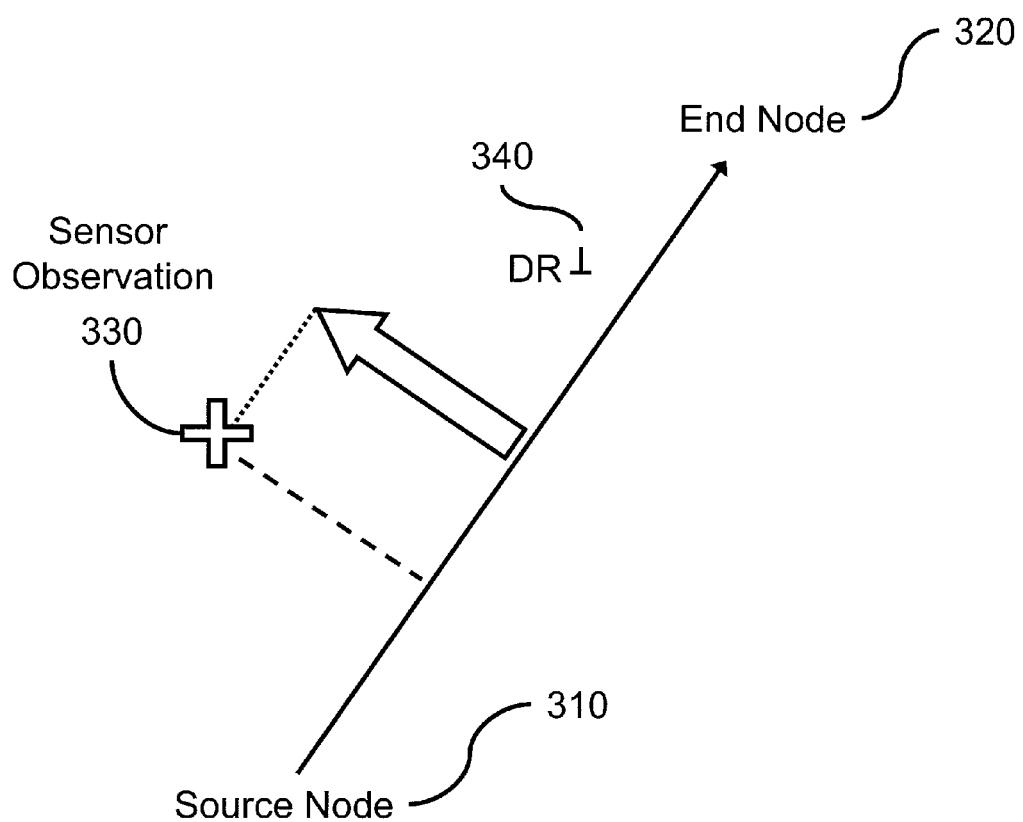
FIG. 3 is a schematic representation illustrating a method for forming a sensor bias measurement based on a selected paring according to an embodiment of the present invention.

FIG. 3 is a schematic representation illustrating a method for forming a sensor bias measurement based on a selected paring according to an embodiment of the present invention.

As discussed above with respect to FIG. 1, after identifying an observation-to-road pairing, a 1-dimensional sensor bias measurement is formed by calculating the perpendicular distance from an observation to a corresponding road. The schematic representation of FIG. 3 illustrates graphically how the bias measurement is foil led. The source node 310 and the end node 320 of the illustration describe system information about a road. The sensor observation 330 is used to determine the bias measurement $DR\perp$ (or DR perpendicular) 340 as described above with respect to FIG. 1.

Figure 4:
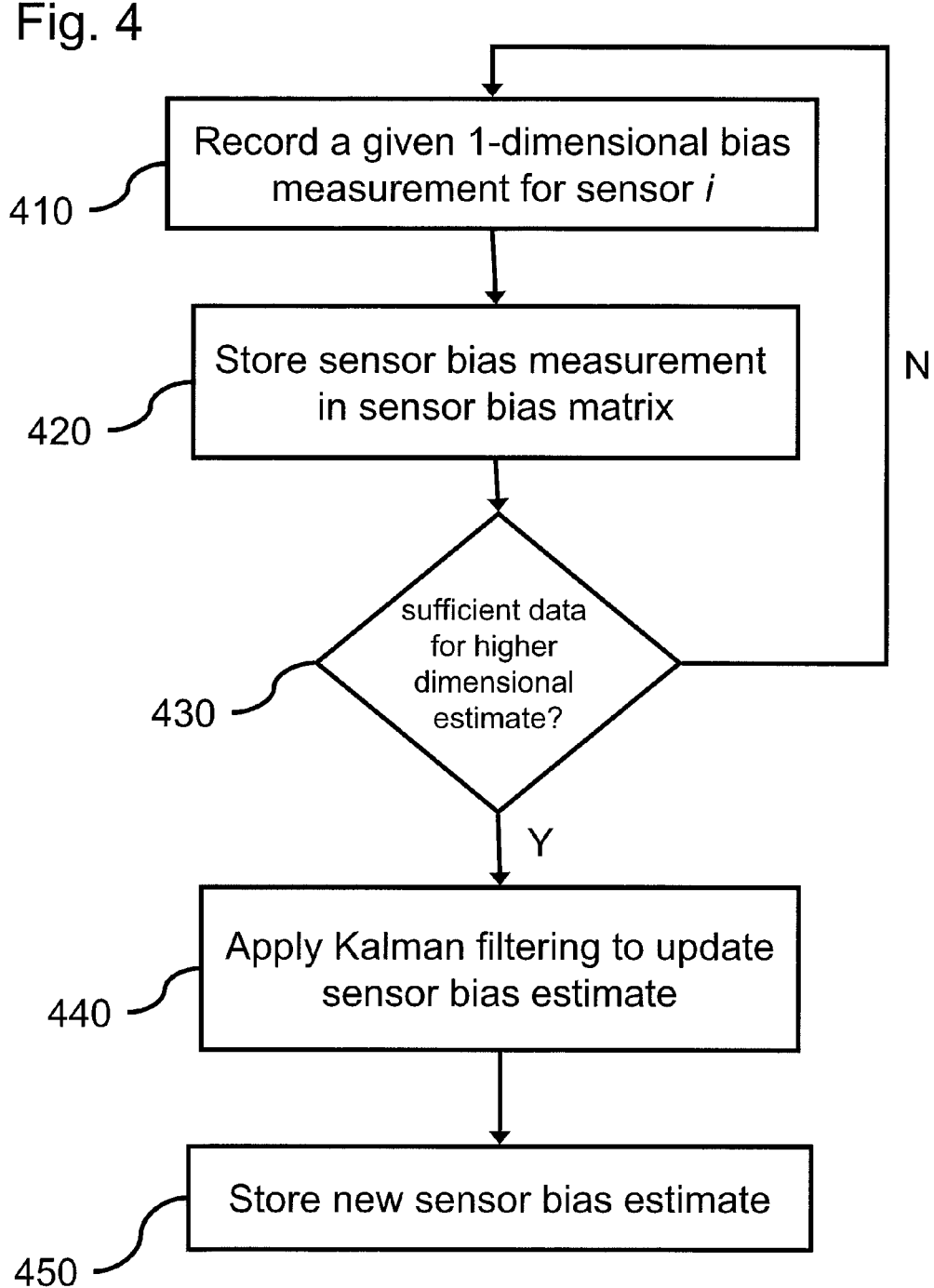
FIG. 4 is a flow diagram illustrating a method for estimating sensor bias based on 1-dimensional sensor bias measurements according to an embodiment of the present invention.

FIG. 4 is a flow diagram illustrating a method for estimating sensor bias based on 1-dimensional sensor bias measurements according to an embodiment of the present invention. The steps described above in FIG. 1 and FIG. 3 illustrate a method for forming a 1-dimensional sensor bias measurement for a sensor. This measurement is recorded in FIG. 3 310. FIG. 4 describes the process whereby these 1-dimensional measurements accumulate over time and are eventually used to estimate a multidimensional bias for a particular sensor. As the 1-dimensional sensor bias measurements accumulate for each sensor, they are stacked into matrices 420 as follows:

$$DR\perp_i = \begin{bmatrix} DR\perp_{i1} \\ \vdots \\ DR\perp_{ik} \end{bmatrix}, H_i^{DR\perp} = \begin{bmatrix} H_{i1}^{DR\perp} \\ \vdots \\ H_{ik}^{DR\perp} \end{bmatrix}, R_{DR\perp i} = \begin{bmatrix} R_{DR\perp i1} & 0 & 0 \\ 0 & \ddots & 0 \\ 0 & 0 & R_{DR\perp ik} \end{bmatrix}.$$

Figure 5:
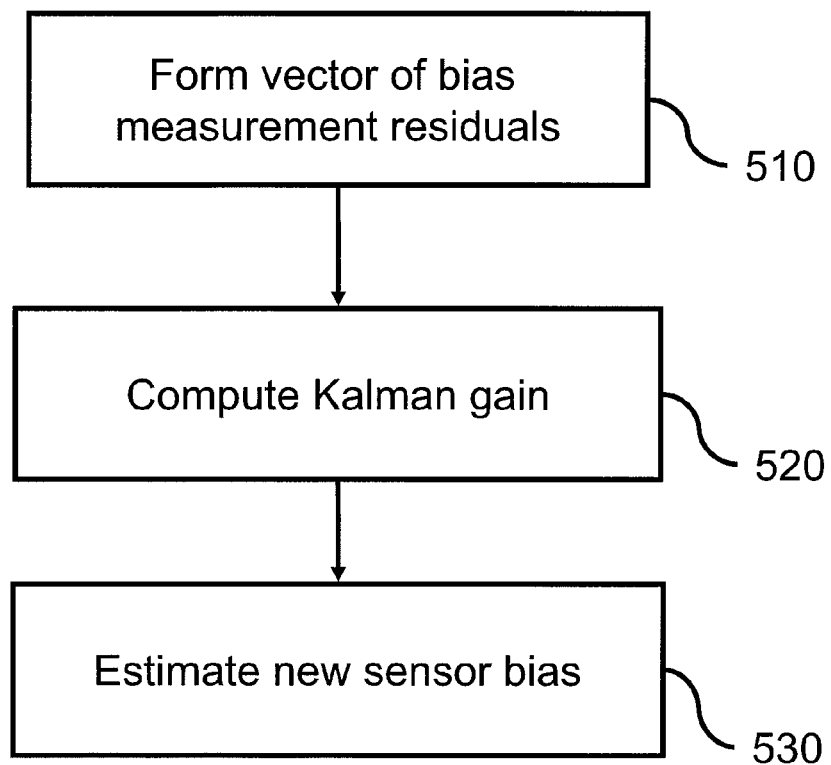
FIG. 5 is a flow diagram illustrating a method for updating sensor bias estimates by computing Kalman gain according to an embodiment of the present invention.

When a sufficient number of 1-dimensional bias measurements for any sensor have accumulated 430, Kalman filtering is a performed 440, this process is described in greater detail in FIG. 4 and FIG. 5. If a sufficient number of bias estimates have not accumulated, then the system continues accumulating measurements. Once the sensor bias estimate is updated, it is stored 450 for use by a sensor bias compensation system. For example, the invention may provide initial and updated sensor bias estimates to a covariance inflation bias compensation system. For a discussion of covariance inflation bias compensation systems, see Hong Li, Eugenia Kalnay, and Takemasa Miyoshi, *Simultaneous Estimation Of Covariance Inflation And Observation Errors Within An Ensemble Kalman Filter*, Q. J. R. Meteorol. Soc. 135: 523-533 (2009), the entire text of which is hereby incorporated by reference for all purposes. A Schmidt-Kalman bias compensation system is another system that may receive estimates from the invention. For a discussion of Schmidt-Kalman bias compensation systems, see Randy Paffenroth, Roman Novoselov, Scott Danford, Marcio Teixeira, Stephanie Chan, and Aubrey Poore, *Mitigation of Biases Using the Schmidt-Kalman Filter*, Proc. SPIE, Vol. 6699, 66990Q (2007). Of course, the bias estimation system of the instant invention and the bias compensation systems discussed above may function together in some embodiments of the invention within a tracking system, and in these embodiments, the use of sensor bias estimates to assist with compensation within a tracking system may impact the estimation process. For example, a sensor bias compensation system within a MHT system may result in an MHT IMM's selection of particular observation-to-road pairings, this in turn may impact the sensor bias measurement and estimation techniques in these embodiments of the instant invention.

FIG. 5 is a flow diagram illustrating a method for updating sensor bias estimates by computing Kalman gain according to an embodiment of the present invention. As FIG. 5 illustrates, according to this method, the system forms a vector of k bias measurement residuals 510 for sensor i using the current bias estimates as $Z_i = DR_{\perp i} - H_i^{DR\perp} X^{B_i}$. The Kalman gain is then computed 520 as $K_i = W_i H_i^T S_{DR\perp}^{-1}$ where $S_{DR\perp} = H_i^{DR\perp} W_i H_i^{DR\perp T} + R_{DR\perp i}$. Using $K_i$ the new sensor bias is estimated 530 as $X^{B_i} = X^{B_i} + K_i Z_i$. The error covariance update for the bias states from sensor i is: $W_i = [I - K_i H_i^{DR\perp}] W_i [I - K_i H_i^{DR\perp}]^T + K_i R_{DR\perp i} K_i^T$. According to some embodiments of the present invention, the track state estimates and error covariance matrices are also updated during the bias update. In other embodiments, the bias updates for multiple sensors are performed simultaneously through a single augmented Kalman update. One embodiment that uses both a simultaneous update of all sensor bias estimates and an update of track state estimates occurs when performing the described bias update within the Schmidt-Kalman bias compensation framework.

Figure 6:
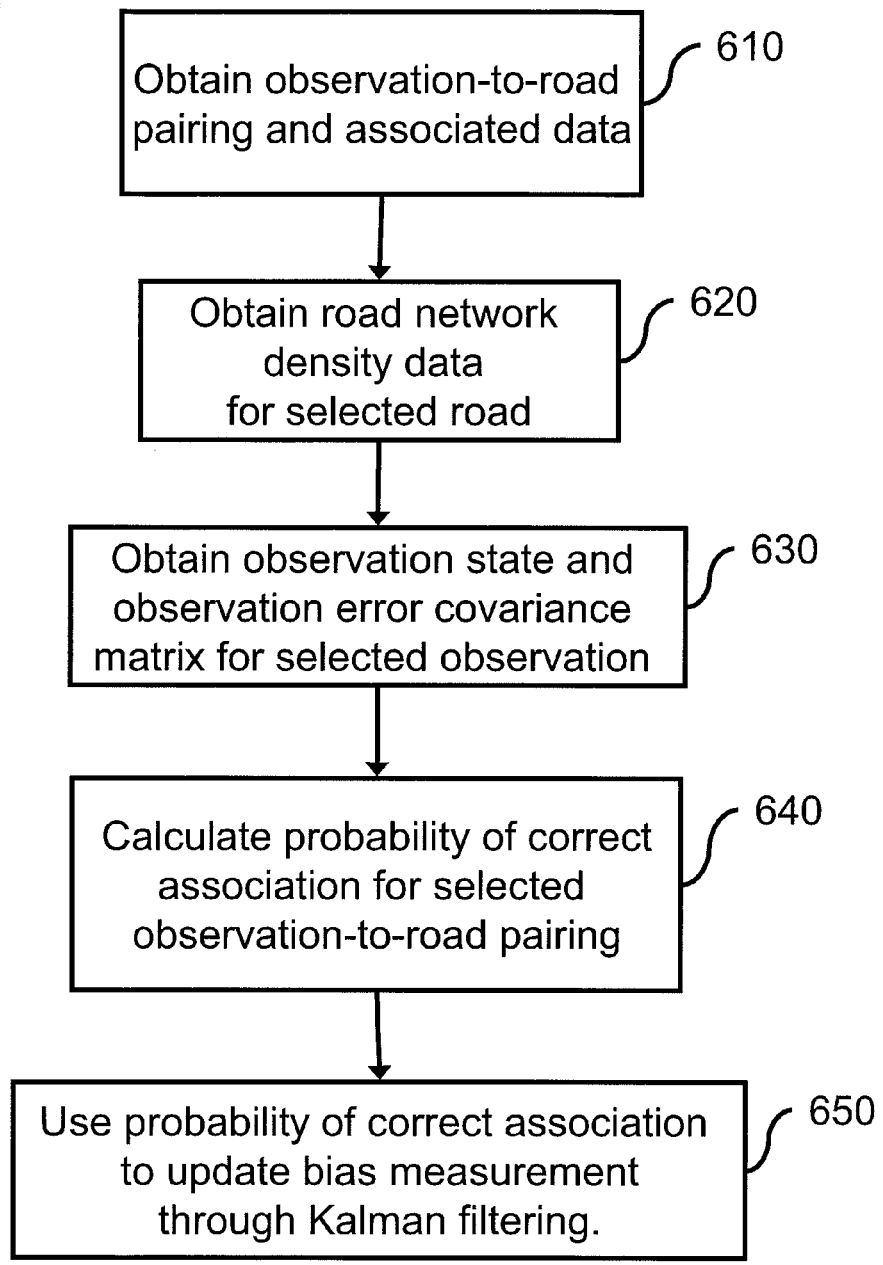
FIG. 6 is a flow diagram illustrating a method for accounting for observation-to-road pairing misassociations by including a probability of correct association into a track filtering process according to an embodiment of the present invention.

FIG. 6 is a flow diagram illustrating a method for accounting for observation-to-road pairing misassociations by including a probability of correct association into a track filtering process according to an embodiment of the present invention. Some of the road-to-observation pairings identified by the IMM will invariably result from targets that are not actually on the identified road segment. If not addressed, system reliance on these misassociations will cause bias error covariance to become overly optimistic, which may hinder the performance of the bias estimator or the MHT system. By addressing these problems the system obtains more accurate bias state estimates and more accurate bias error covariance estimates.

As FIG. 6 illustrates, according to this method, the system obtains data pertaining to an observation-to-road pairing 610, road network density data for a selected road 620, and the observation state and observation error covariance matrix for the selected observation 630. The road network density data 620 may include information about the number of roads in the area and also information about the probability that each road is associated with the observation. The observation state and observation error covariance matrix for the selected observation 630 is provided to the system from the sensor. The system then calculates the probability of a correct association between the observation and the road 640.

To determine the probability of correct association between the observation and the road 640, the system begins by assuming that all road-observation pairings have a known probability of correct association $p_{CA}$. This tunable parameter may depend on the density of the road network in relation to the observation error covariance matrix for the selected observation. The optimal Kalman gain for the set of measurements is then given by $$K_i = W_i H_i^{DR\perp T} \left( (H_i^{DR\perp} W_i H_i^{DR\perp T} + R_{DR\perp i}) + \frac{(1-p_{CA})}{p_{CA}} Z_i Z_i^T \right)^{-1}$$

or $$K_i = W_i H_i^{DR\perp T} \left( S_{DR\perp} + \frac{(1-p_{CA})}{p_{CA}} Z_i Z_i^T \right)^{-1}.$$

The system uses this Kalman gain to update the bias measurement states for each sensor i according to $X^{B_i} = X^{B_i} + K_i Z_i$ and to update the bias measurement covariance matrix 650 according to $W_i = p_{CA}([I - K_i H_i^{DR\perp}] W_i [I - K_i H_i^{DR\perp}]^T + K_i R_{DR\perp i} K_i^T) + (1 - p_{CA})(W_i + K_i Z_i Z_i^T K_i^T)$.

Figure 7:
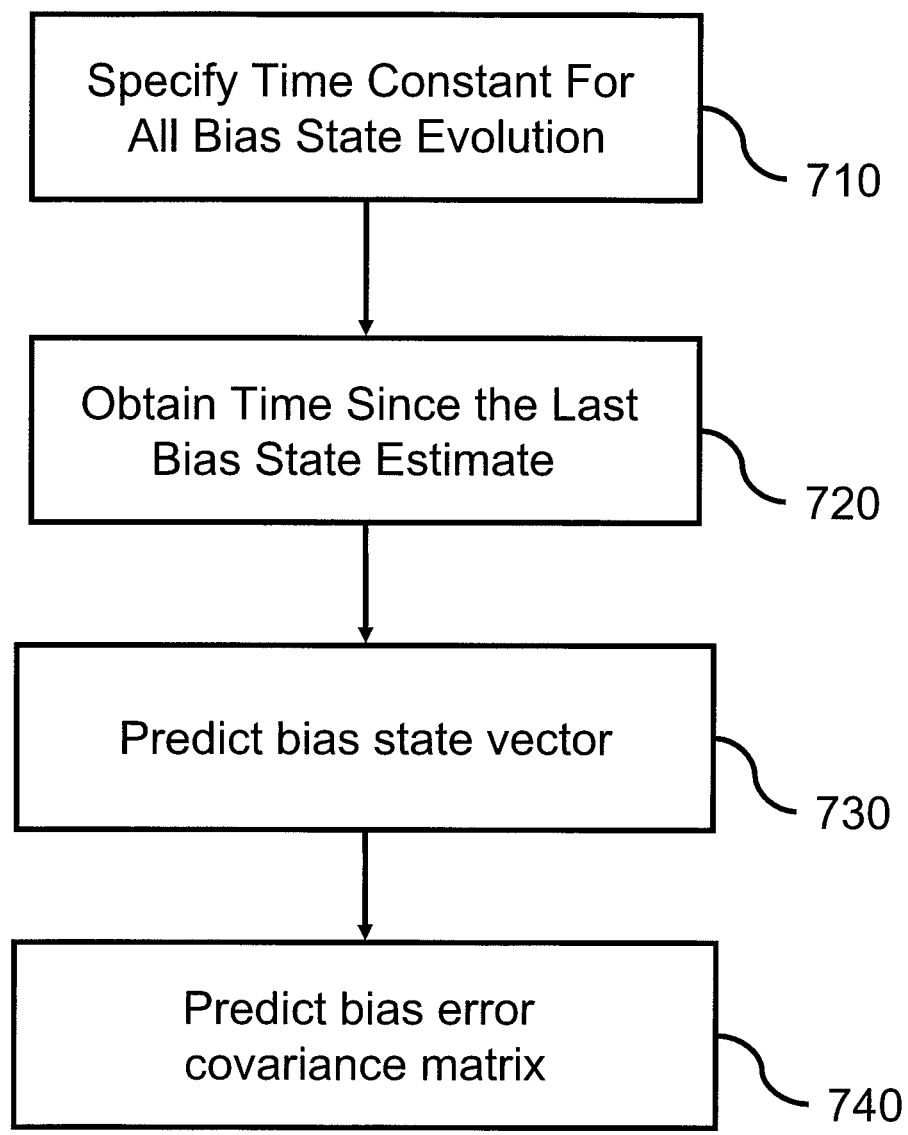
FIG. 7 is a flow diagram illustrating the involvement of a bias state time constant in bias estimation according to an embodiment of the present invention.

FIG. 7 is a flow diagram illustrating the involvement of a bias state time constant in bias estimation according to an embodiment of the present invention. This is necessary because over time any bias estimate will degrade and as a result will become less helpful within a tracking system, so the inclusion of a bias state time constant allows the system to place less reliance on older bias estimates. As FIG. 7 illustrates, according to this method, a time constant for all bias state evolution is specified 710, the system also obtains the time since the last bias state, estimate for the identified sensor 720. $\Delta t$ is the time since the last bias state prediction/update and $\tau_{ji}$ is the time constant for $j^{th}$ the bias state of the $i^{th}$ sensor. The system then uses the time constant and time since the last bias state estimate in updating its estimated sensor bias. In particular it updates the estimate of the bias state vector 730 according to the following equation: $X^{B_i} = \Phi_{B_i} X^{B_i}$ where $$\Phi_{B_i} = \begin{bmatrix} e^{\frac{\Delta t}{\tau_{1i}}} & & 0 \\ & \ddots & \\ 0 & & e^{\frac{\Delta t}{\tau_{mi}}} \end{bmatrix}$$

and it updates the estimate of the bias error covariance matrix 740 according to the following equation: $W_i = \Phi_{B_i} W_i \Phi_{B_i}^T + Q_{B_i}$ where $Q_{B_i} = W_{O_i} - \Phi_{B_i} W_{O_i} \Phi_{B_i}^T$.

Figure 8:
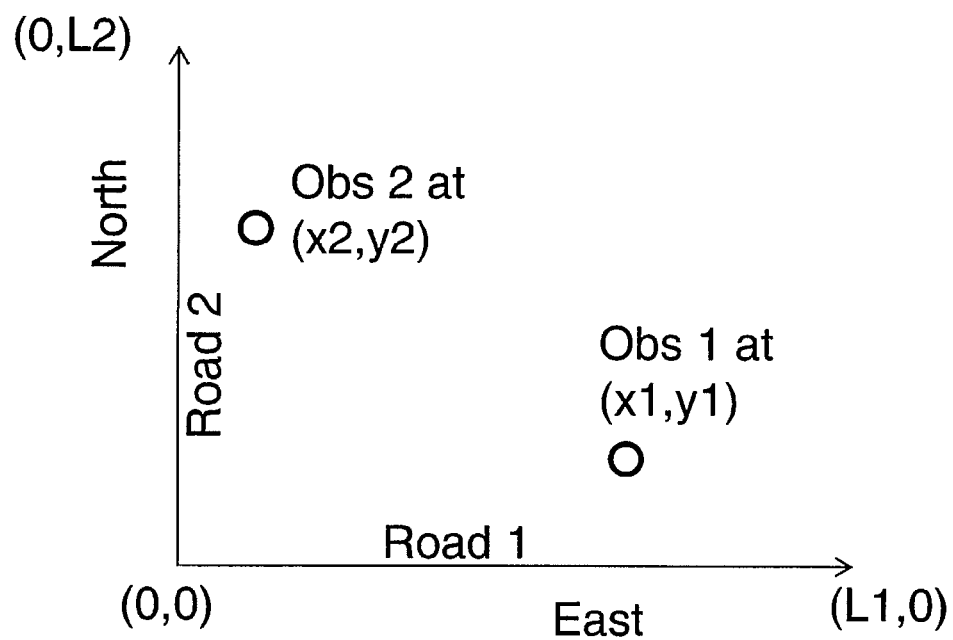
FIG. 8 is a schematic representation of the locations of two initial observations illustrating a simplified example of one embodiment of a method for estimating sensor bias.

One embodiment of the invention may be better understood in light of the following simplified example of the method described with reference for FIGS. 1-4. In this example, two initial observations are obtained and employed in estimating sensor bias. FIG. 8 is a schematic representation of the locations of two initial observations in this simplified example.

Assume we have sensor 1, which measures the East and North positions of targets. Consider 2 observations, both from sensor 1, as shown in FIG. 8:

$$Y_1 = \begin{bmatrix} x1 \\ y1 \end{bmatrix}, Y_2 = \begin{bmatrix} x2 \\ y2 \end{bmatrix}$$

Then transformation from the measurement to Xpos is:

$$H_m^{Xpos} = \begin{bmatrix} 1 & 0 \\ 0 & 1 \end{bmatrix}$$

Road orientations for the two segments are: $\theta_1 = 0$, $\theta_2 = 90°$
Position offsets for observations 1 and 2 relative to roads 1 and 2 are:

$$\Delta X_{pos,1,1} = \begin{bmatrix} 1 & 0 \\ 0 & 1 \end{bmatrix} \begin{bmatrix} x1 \\ y1 \end{bmatrix} - \begin{bmatrix} 0 \\ 0 \end{bmatrix} = \begin{bmatrix} x1 \\ y1 \end{bmatrix},$$

$$\Delta X_{pos,2,2} = \begin{bmatrix} 1 & 0 \\ 0 & 1 \end{bmatrix} \begin{bmatrix} x2 \\ y2 \end{bmatrix} - \begin{bmatrix} 0 \\ 0 \end{bmatrix} = \begin{bmatrix} x2 \\ y2 \end{bmatrix}$$

Transformation matrices for observations 1 and 2 with respect to roads 1 and 2 are:

$$C_{Xpos,1,1}{}^{DR\perp} = [-\sin(0°)\cos(0°)] = [0\ 1], C_{Xpos2,2}{}^{DR\perp} = [-\sin(90°)\cos(90°)] = [-1\ 0]$$

Perpendicular distances of both measurements from sensor 1 are:

$$DR\perp_{11} = C_{Xpos1,1}{}^{DR\perp} \Delta X_{pos1,1} = y1, DR\perp_{12} = C_{Xpos2,2}{}^{DR\perp} \Delta X_{pos,2,2} = -x1$$

For an assumed road uncertainty of 3 m in East and North, random measurement error of 4 m in East and North, and a bias uncertainty of 12 m in East and North for sensor 1, we have:

$$R_{src\_node} = \begin{bmatrix} 3^2 & 0 \\ 0 & 3^2 \end{bmatrix}, R_m = \begin{bmatrix} 4^2 & 0 \\ 0 & 4^2 \end{bmatrix}, W_1 = \begin{bmatrix} 12^2 & 0 \\ 0 & 12^2 \end{bmatrix}$$

The uncertainty for each measurement of perpendicular distance is therefore $(5\ m)^2$:

$$R_{DR\perp 11} = [0\ 1] \left( \begin{bmatrix} 1 & 0 \\ 0 & 1 \end{bmatrix} \begin{bmatrix} 4^2 & 0 \\ 0 & 4^2 \end{bmatrix} \begin{bmatrix} 1 & 0 \\ 0 & 1 \end{bmatrix}^T + \begin{bmatrix} 3^2 & 0 \\ 0 & 3^2 \end{bmatrix} \right) [0\ 1]^T = 5^2$$

$$R_{DR\perp 12} = [-1\ 0] \left( \begin{bmatrix} 1 & 0 \\ 0 & 1 \end{bmatrix} \begin{bmatrix} 4^2 & 0 \\ 0 & 4^2 \end{bmatrix} \begin{bmatrix} 1 & 0 \\ 0 & 1 \end{bmatrix}^T + \begin{bmatrix} 3^2 & 0 \\ 0 & 3^2 \end{bmatrix} \right) [-1\ 0]^T = 5^2$$

The sensitivity of the measured off-road distance to bias error is:

$$H_{11}^{DR\perp} = [0\ 1] \begin{bmatrix} 1 & 0 \\ 0 & 1 \end{bmatrix} = [0\ 1]$$

$$H_{12}^{DR\perp} = [-1\ 0] \begin{bmatrix} 1 & 0 \\ 0 & 1 \end{bmatrix} = [-1\ 0]$$

Assuming initial bias estimates of 0 for East and North, the vector of bias measurement residuals is:

$$Z_1 = DR\perp_1 - H_1^{DR\perp} X^{B_1} = DR\perp_1 = \begin{bmatrix} y1 \\ -x2 \end{bmatrix}$$

The Kalman gain is:

$$K_1 = W_1 H_1^{DR\perp T} S_{DR\perp}^{-1}$$

$$= \begin{bmatrix} 12^2 & 0 \\ 0 & 12^2 \end{bmatrix} \begin{bmatrix} 0 & 1 \\ -1 & 0 \end{bmatrix} \begin{bmatrix} 13^2 & 0 \\ 0 & 13^2 \end{bmatrix}^{-1}$$

$$= \begin{bmatrix} 0 & -\left(\frac{12}{13}\right)^2 \\ \left(\frac{12}{13}\right)^2 & 0 \end{bmatrix}$$

$$= \begin{bmatrix} 0 & -.852 \\ .852 & 0 \end{bmatrix}$$

where $$S_{DR\perp} = H_1^{DR\perp} W_1 H_1^{DR\perp T} + R_{DR\perp 1}$$

$$= \begin{bmatrix} 0 & 1 \\ -1 & 0 \end{bmatrix} \begin{bmatrix} 12^2 & 0 \\ 0 & 12^2 \end{bmatrix} \begin{bmatrix} 0 & 1 \\ -1 & 0 \end{bmatrix}^T + \begin{bmatrix} 5^2 & 0 \\ 0 & 5^2 \end{bmatrix}$$

$$= \begin{bmatrix} 13^2 & 0 \\ 0 & 13^2 \end{bmatrix}$$

The bias estimate is then undated as:

$$X^{B_1} = X^{B_1} + K_1 Z_1 \begin{bmatrix} 0 \\ 0 \end{bmatrix} + \begin{bmatrix} 0 & -.852 \\ .852 & 0 \end{bmatrix} \begin{bmatrix} y1 \\ -x2 \end{bmatrix} = \begin{bmatrix} .852\ x2 \\ .852\ y1 \end{bmatrix}$$

And the bias uncertainty is updated as:

$$W_1 [I - K_1 H_1^{DR\perp}] W_1 [I - K_1 H_1^{DR\perp}]^T + K_1 R_{DR\perp 1} K_1^T = \begin{bmatrix} 21.3 & 0 \\ 0 & 21.3 \end{bmatrix} = \begin{bmatrix} 4.61^2 & 0 \\ 0 & 4.61^2 \end{bmatrix}$$

Figure 9:
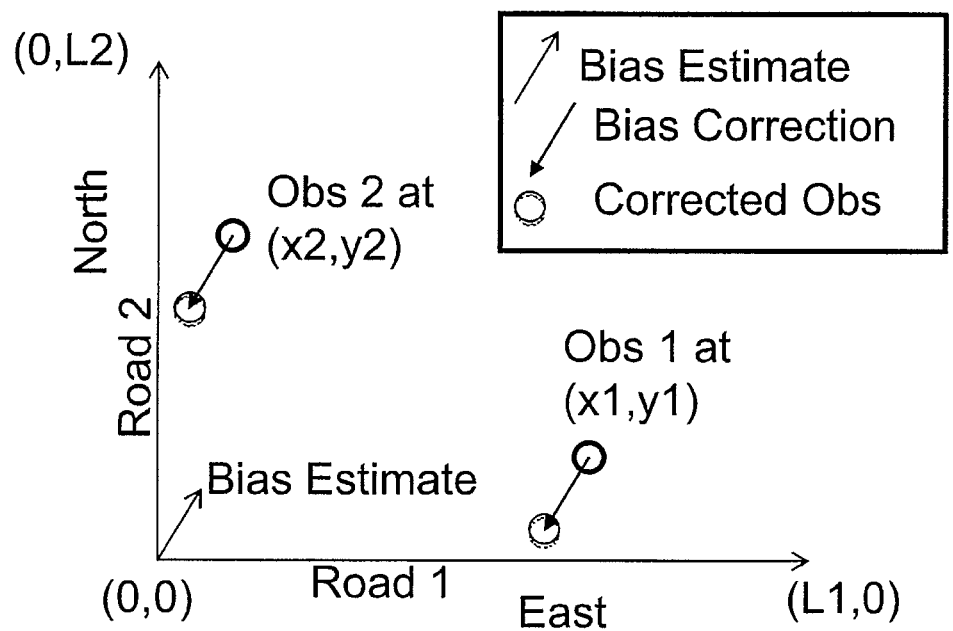
FIG. 9 is a schematic representation of the locations of two initial observations, a bias estimate, bias correction, and two corrected observations illustrating a simplified example of one embodiment of a method for estimating sensor bias.

In this simplified example of one embodiment of the invention, the bias estimates have moved by 85.2% of the measured off-road distances in East and North, and the bias uncertainties have been reduced from 25 m to 4.61 m due to the update. The resulting bias estimates and corresponding measurement corrections are shown in the FIG. 9.

It will be recognized by those skilled in the art that various modifications may be made to the illustrated and other embodiments of the invention described above, without departing from the broad inventive scope thereof. For example, a variety of different types of sensors and different measurement techniques and technologies may be employed by one practicing this invention. Additionally, although the calculations disclosed are performed by a computer they may be performed by a variety of other methods within the scope of this invention. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method executed by a processor for forming a sensor bias measurement for a target moving on a road, the method comprising:

obtaining by the processor, road location data from a database;

obtaining by the processor, sensor observation data from a plurality of sensors;

identifying by the processor, a sensor observation that corresponds to the target on the road to obtain an observation-to-road pairing;

forming by the processor, a one-dimensional sensor bias measurement by calculating a perpendicular distance from an observation point to the road; and, storing and accumulating a plurality of the one-dimensional sensor bias measurements in a storage medium to form an estimated multi-dimensional sensor bias measurement.

2. The method of claim 1, wherein the observation-to-road pairing is identified by an interacting multiple model (IMM) that determines that the observation reflects the movement of the target on the road.

3. The method of claim 1, wherein the observation-to-road pairing is identified by a multiple hypothesis tracker (MHT), using interacting multiple models (IMMs).

4. The method of claim 1 wherein the sensor bias measurements are stored for use in sensor bias estimation.

5. The method of claim 1, wherein the plurality of sensors includes one or more of cameras, electro-optical sensors and infrared sensors.

6. The method of claim 1, further comprising forming a plurality of matrices for use in estimating multi-dimensional sensor bias, from the accumulated plurality of the one-dimensional sensor bias measurements.

7. The method of claim 1, wherein said identifying a sensor observation that corresponds to the target on the road further comprises comparing sensor observation data from the plurality of sensors pertaining to the target to multiple models including different assumptions; and selecting a model from the multiple model for use in bias estimation that is determined to have a greater than a certain minimum probability of accurately describing the target movement at the time that the road is selected as a root node during a track pruning process.

8. The method of claim 1, wherein said identifying a sensor observation that corresponds to the target on the road further comprises accessing by the processor, multiple models used for tracking target movement and selecting a best model from the multiple models, and using the selected best model to obtain the observation-to-road pairing.

* * * * *